United States Patent
Nordback

(10) Patent No.: US 8,740,625 B2
(45) Date of Patent: Jun. 3, 2014

(54) SYSTEMS AND METHODS FOR STOCHASTIC REGRESSION TESTING OF PAGE DESCRIPTION LANGUAGE PROCESSORS

(75) Inventor: Kurt Nathan Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 672 days.

(21) Appl. No.: 12/650,925

(22) Filed: Dec. 31, 2009

(65) Prior Publication Data

US 2011/0157620 A1 Jun. 30, 2011

(51) Int. Cl.
*G09B 7/00* (2006.01)
*G06F 3/12* (2006.01)

(52) U.S. Cl.
USPC .......................... 434/322; 358/1.15; 358/419

(58) Field of Classification Search
USPC ........................................................ 358/1.15
See application file for complete search history.

(56) References Cited

U.S. PATENT DOCUMENTS

| 6,490,696 B1 | 12/2002 | Wood et al. | |
| 2002/0087560 A1* | 7/2002 | Bardwell | 707/100 |
| 2003/0180703 A1* | 9/2003 | Yates et al. | 434/353 |
| 2005/0181346 A1* | 8/2005 | Heller | 434/322 |
| 2007/0121172 A1* | 5/2007 | Hamada | 358/419 |

OTHER PUBLICATIONS

Lorem Ipsum http://web.archive.org/web/20020123143646/http://www.lipsum.com/ (Jan. 2002).*

* cited by examiner

*Primary Examiner* — Huo Long Chen
(74) *Attorney, Agent, or Firm* — Osha Liang LLP

(57) ABSTRACT

Systems and methods consistent with embodiments presented pertain to the stochastic regression testing of software PDL processors. Test input for PDL processors, which include language processors and raster image processors, may be generated by randomly altering the values of one or more of text, graphical object parameters, image object parameters, graphical combination parameters in an existing PDL input file. In another embodiment, test input for PDL processors may be generated by randomly selecting a first token from a lexical token dictionary and combining the first token with at least one of a plurality of second tokens randomly selected from the lexical token dictionary, so that the combination of the first token and the plurality of second lexical tokens satisfies the syntactical rules for the PDL. In a further embodiment, existing tests in a test pool may split and recombined in a syntactically correct manner to generate new tests.

8 Claims, 5 Drawing Sheets

SYSTEMS AND METHODS FOR STOCHASTIC REGRESSION TESTING OF PAGE DESCRIPTION LANGUAGE PROCESSORS

BACKGROUND

1. Technical Field

The present disclosure relates to the field of printing and in particular, to systems and methods for the stochastic regression testing of page description language processors.

2. Description of Related Art

Print content, which may include documents with text, image and graphical data, may be represented and stored using a variety of formats. Typically, document processing software running on a computing device may allow users to view, edit, process, and store the documents conveniently. In many systems, when a document is to be printed, the document, or pages in the document, may be sent to the printer in the form of a Page Description Language ("PDL"). PDLs may include PostScript™, Adobe™ PDF, HP™ PCL, Microsoft™ XPS, and variants thereof. A PDL description of a document provides a high-level description of each page in a document. This PDL description is often translated to a series of lower-level printer-specific commands when the document is being printed. The process of transforming page data from a PDL description to lower-level printer-specific commands may be complex and depend on the features and capabilities offered by exemplary printer. The transformation is typically performed by one or more of a language processor, or a raster image processor ("RIP"), which may often be implemented by software and/or firmware, running on a computer or printer. After the translation process for each page has been completed, the document may be printed. The term PDL processor is used generically to refer to software or firmware, such as a language processor and/or a RIP, involved in the processing of PDL input.

Because of the complexity of the process of transforming data in PDLs into a printed image on a paper, rigorous testing of language processing and RIP software is essential. Typically, PDL processors are subjected to behavioral testing where a fixed set of inputs is fed to the software and the output produced in compared with stored known data. Behavioral regressions, or changes in output, manifest themselves as a change from a previously known behavior. Therefore, behavioral regressions can be detected if the input for the regression test was identical to the input that was used to determine the prior known behavior.

A fixed suite of tests has the disadvantage that the same set of points in the input space is tested repeatedly. Thus, potential problems that may be exposed using an alternate set of points in the input space may remain undetected. Stochastic regression testing may be used to remedy this shortcoming. Stochastic regression testing uses random points in the input space to test program code. However, when stochastic regression testing is used with PDL processors, which convert a PDL description to pixels on a printed page, the testing has hitherto been of limited use because the generation of completely random strings of data do not produce syntactically correct PDL input in the overwhelming majority of cases. Therefore, in practice, such tests do no more than verifying the ability of the PDL processor to correctly reject invalid data. The ability to generate syntactically correct random input would greatly enhance the robustness of testing. Therefore, there is a need for systems and methods that would permit robust testing of PDL processors using random and/or pseudo-random techniques.

SUMMARY

Consistent with disclosures herein, systems and methods for stochastic regression testing for PDL processors are presented. In some embodiments, a method for generating stochastic PDL test inputs includes the modification of at least one existing PDL file. The modification is carried out by performing at least one of the steps of: replacing existing text data in the PDL file with randomly generated text data; or replacing values of parameters associated with at least one existing graphics object in the PDL file with randomly generated parameter values, or replacing values of parameters associated with at least one image object in the PDL file with randomly generated parameter values, or replacing values of parameters associated with graphical combining operations for at least one image or graphics object with randomly generated parameter values. The modified PDL file can be stored and used as test input to a PDL processor.

These and other embodiments are further explained below with respect to the following figures.

DETAILED DESCRIPTION

Consistent with disclosed embodiments, systems and methods for stochastic regression testing of PDL processors are presented.

Figure 1:
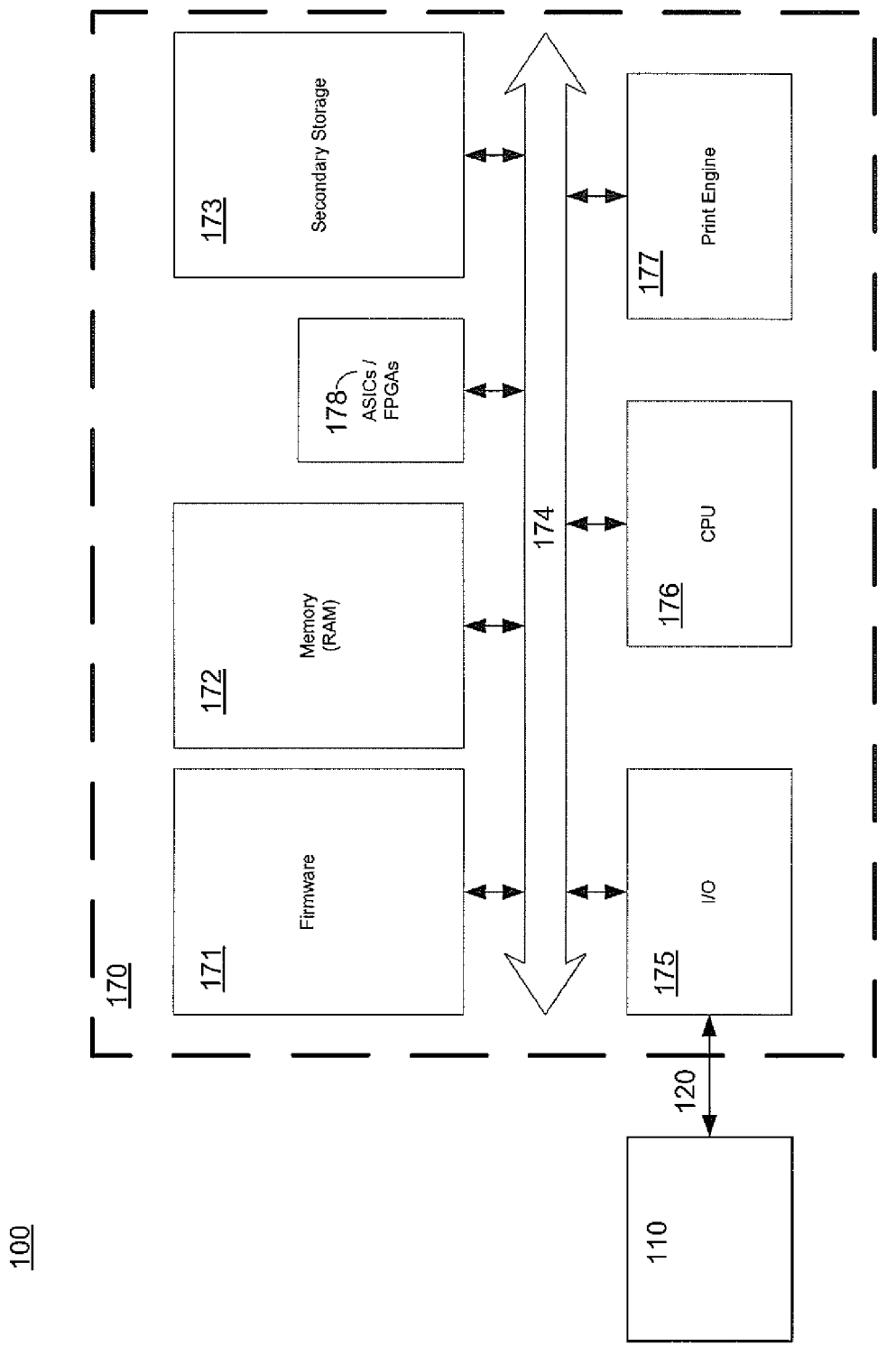
FIG. 1 depicts an exemplary system capable of being used for stochastic regression testing of PDL processors with an exemplary printer coupled to a computer.

FIG. 1 depicts an exemplary system 100 capable of being used for stochastic regression testing of PDL processors with exemplary printer 170 coupled to a computer 110. A computer software application for stochastic regression testing of PDL processors that is consistent with embodiments disclosed herein may be deployed on system 100. Note that system 100 is exemplary and used for descriptive purposes only. In general, a system for stochastic regression testing of PDL processors, consistent with disclosed embodiments, may be deployed on a network comprising a plurality of computers, servers, printers, print controllers, display devices, network devices, and peripherals with appropriate modifications as would be apparent to a person of ordinary skill in the art. System 100 may also include various related software applications such as automatic test generators, PDL and printer simulators, and result analyzers to analyze the results of testing.

In one embodiment, an application for the stochastic regression of PDL processors may generate input for a PDL processor running on computer 110 and the results produced may be compared and analyzed with known or expected results using a variety of custom or off the shelf applications. In another embodiment, the input for the PDL processor generated by the stochastic regression testing application may be sent to printer 170 and the output may be viewed on a print medium. In another embodiment, in addition to printing the received input, printer 170 may dump the output produced to secondary storage 173, or send the output back to computer 110 over connection 120 for storage and further analysis. Various other methods for processing and analyzing the output of the PDL processor may be used as would be apparent to one of ordinary skill in the art.

Computing device 110 may be a computer workstation, desktop computer, laptop computer, or any other computing device capable of generating PDL documents for printing and/or processing PDL documents. Computing device 110 and server 130 may be capable of executing software (not shown) that allows the printing of documents using printers 170. Computing device 110 may also contain one or more removable media drives capable of supporting various media such as CDs and DVDs (including recordable and rewritable media), USB based storage (including flash memory and hard disks), memory cards, and/or any other removable media consistent with disclosed embodiments.

Connection 120, which couples computing device 110 and printer 170, may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet™, and/or USB ports for transmission of data through the appropriate connection. The communication links could be wireless links or wired links or any combination consistent with disclosed embodiments that allows communication between the devices.

In some embodiments, such an arrangement may allow for the direct printing of documents specified using PDLs, with (or without) additional processing by computing device 110. Note that print processing can also be distributed. Thus, computing device 110 and/or printer 170 may perform portions of print processing such as processing of PDL data, and/or other manipulation processes before a document is physically printed by printer 170.

Exemplary printer 170 includes devices that produce physical documents by processing PDLs including, but not limited to, laser printers, ink-jet printers, and LED printers. Functionally, printer 170 may take the form of a plotter, facsimile machine, a digital copier, or a multi-function device. In some embodiments, printer 170 may also be capable of independently processing and printing documents described using PDLs received from computing device 110 over connection 120.

As shown in FIG. 1, printer 170 may contain bus 174 that couples central processing unit (CPU) 176, firmware 171, memory 172, input/output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to process PDLs according to one or more disclosed embodiments. In another embodiment, printer 170 may also be able to execute a stochastic regression testing application for PDL processors from secondary storage or other memory in computing device 110 using I/O ports 175 and connection 120. Test results may also be stored in memory or secondary storage in computer 110. In some embodiments, printer 170 may also be capable of executing software such as a printer operating system, software to process and transform PDL data, perform stochastic regression testing, and other appropriate application software.

In some embodiments, CPU 176 may be a general-purpose processor, a special purpose processor, a digital signal processor, or an embedded processor. CPU 176 can exchange data including control information and instructions with memory 172 and/or firmware 171. Memory 172 may be any type of Dynamic Random Access Memory (DRAM) such as but not limited to SDRAM, RDRAM, and/or DDR. Firmware 171 may hold instructions and data including but not limited to a boot-up sequence, various pre-defined routines, and other code. In some embodiments, code and data for processing PDL data may reside in firmware 171 may be copied to memory 172 prior to being acted upon by CPU 176. Routines in firmware 171 may include code to translate PDL page descriptions received from computing device 110. In some embodiments, the PDL data input to printer 170 may be generated by an application for stochastic regression testing of PDL processors.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. ASICs/FPGAs 178 may also implement one or more of PDL processing, translation, compression, and rasterization algorithms.

In some embodiments, a PDL processing application and/or an application for regression testing of PDL processors may be stored in memory 172 or secondary storage device 173. Exemplary secondary storage device 173 may be an internal or external hard disk, memory stick, or any other memory storage device capable of being used system 100.

Figure 2:
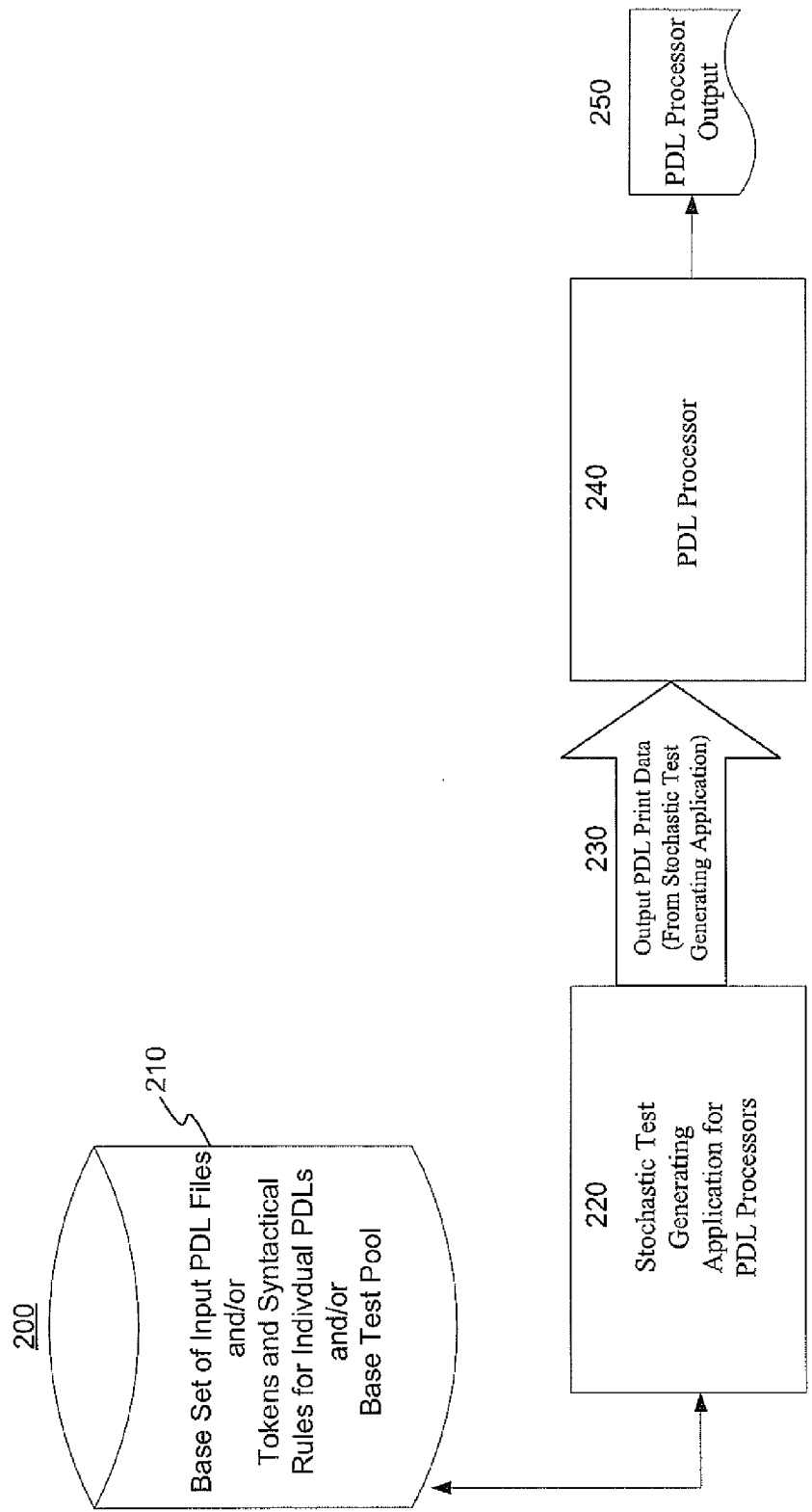
FIG. 2 shows a typical exemplary high-level architecture of a system for stochastic regression testing of PDL processors.

FIG. 2 shows an exemplary high-level architecture 200 of a system for regression testing of PDL processors. In some embodiments, exemplary architecture 200 may comprise of database 210, which may include tokens and syntactical rules for individual PDLs, and/or a base set of input PDL files, and/or a base set of tests. The syntax of many computer languages, including PDLs, can usually be formally specified by a grammar. Grammars can indicate valid tokens (words) in the PDL, as well as valid constructions of lexical tokens (statements) in the PDL. In some embodiments, the tokens and syntactical rules for each PDL supported by the PDL processor may be codified and stored in database 210. In some embodiments, database 210 may also include a base set of PDL files that may be modified in a manner consistent with embodiments described, and/or a base set of tests that may be capable of being decomposed into smaller tests and reconstituted.

Exemplary architecture 200 may also include test generating application for PDL processors 220. In one embodiment, stochastic test generating application 220 may modify one or more existing PDL files in the base set of input PDL files by randomizing content, and/or object parameters in the files to generate a new suite of tests for stochastic regression testing. In some embodiments, stochastic test generating application 220 may select pairs of tests from a base test pool and break the test pairs up into smaller tests, which may recombined in various ways to generate a new suite of regression tests.

In another embodiment, stochastic test generating application 220 may obtain tokens in a random or pseudo-random manner from database 210 and combine them in accordance with syntactical rules for the PDL language to create syntactically correct PDL descriptions. In general, tokens may be one or more of: commands available in the PDL language, user and system defined variables, constants, delimiters, logical and mathematical operators, command parameters, etc. Syntactical rules specify how the tokens may be combined to form valid PDL descriptions. For example, the rules may specify that PDL file begin with a specific string. As another example, the rules may specify that a command must be followed by a specified number of parameters. In the example above, test generating application may use the rules to randomly or pseudo-randomly assign appropriate values to the parameters following the command.

In some embodiments, stochastic test generating application 220 may store the output PDL print data 230 in a file, in memory, and/or may send the data to PDL processor 240. The file holding output print data 230 may be given a name to enable correlation of output print data 230, which serves as input to PDL processor 240, with PDL processor output 250. In some embodiments, stochastic test generating application 220 may also use other information such as the size of the print medium, and other system and printer characteristics to determine appropriate ranges for the random or pseudo-random values. For example, the values assigned to image size and position data may be chosen so that an image either fits within the boundaries of a page, or overshoots page boundaries by some amount. For example, stochastic test generating application 220 may deliberately size or position an image to overshoot page boundaries to determine if the image is correctly clipped by the PDL processor.

Exemplary output PDL print data 230 is input to PDL processor 240. In some embodiments, PDL processor 240 may be application running on computer 110, printer 170, or distributed between computer 110 and printer 170. PDL processor may act on the input in accordance with the commands in PDL print data 230 to produce PDL processor output 250. PDL processor output 250 may be output in any form suitable for analysis. Accordingly, PDL processor output may take the form of files, printed images on a print medium, memory dumps, etc., or some combination of the above and may depend on the techniques used to analyze PDL processor output 250. In some embodiments, PDL processor 240 may be a software simulator that simulates the operation of one or more subsystems of printer 170.

Figure 3:
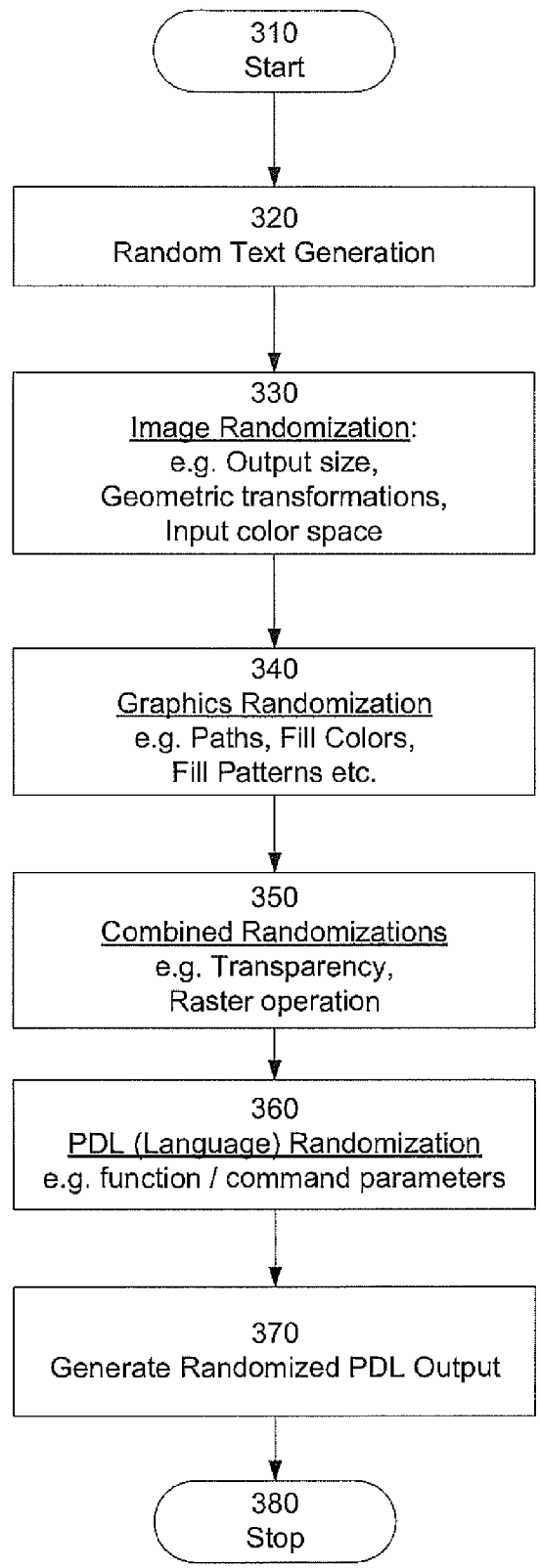
FIG. 3 shows a flowchart depicting a single iteration of an exemplary method for randomizing the input to a PDL processor using a specified input file.

FIG. 3 shows a flowchart depicting single iteration of an exemplary method 300 for randomizing the input to a PDL processor using a specified input file. In some embodiments, method 300 may be performed by stochastic test generating application 220. In some embodiments, an existing PDL file from a base set of input PDL files in database 210 may be used by test generating application 220 to create random or pseudo-random tests for PDL processor 240. Method 300 may commence in step 310, where initialization routines may be performed. For example, an existing input PDL file from a base set of PDL files may be selected, and a file to hold the output created by method 300 may be created. In some embodiments, method 300 may randomize text content and/or parameters associated with graphical and image objects in the selected input PDL file.

In step 320, random text may be generated for placement in the PDL output generated by method 300. The random text may replace or augment text content existing in a pre-existing PDL file that may be selected as input to method 300. For example, text can be generated randomly or pseudo-randomly by selecting chunks from the existing document or by using an "ipsum-lorem"-style generator. Ipsum-lorem style generators output random sequences of text strings. The random (or pseudo-random) chunks of text or text strings may form a part of the "text" data portion of the PDL output generated by method 300.

In step 330, image related parameters for one or more images in the input file may be varied by changing the output size, geometric transformation, or input color space appropriately in a random or pseudo-random manner. Geometric transformations may include operations such as rotation, flipping, etc. of the image. In some embodiments, the algorithm may ensure that the random values assigned are valid. For example, the algorithm may ensure that the random values generated for points in a color space conform to valid data points in that color space.

In step 340, the attributes of graphics objects in the input file may be randomized. For example, graphics parameters can be varied by randomizing graphical object related parameters such as paths, randomizing fill colors, and/or fill patterns, etc. Next, in step 350, some graphics and image objects used in the earlier steps may be combined by using randomized values of transparency, raster operation, etc. Transparency indicates the opacity of an object. The transparency of a superimposing object determines the extent to which obscured portions of an underlying object will be visible. Raster operation relates to the manner in which different objects, which contribute to the value of a pixel, are combined to arrive at the final value of the pixel.

In step 360, randomization may be performed on PDL command parameters in the input file. For example, in a Postscript-language test file, which includes a "rectfill" command to draw a rectangle, parameters of the rectfill command could be randomized. The typical format for the rectfill command is x y width height rectfill In step 360, the existing test file may be scanned and the four parameters x, y, height, and width, which precede the rectfill command may be selected for pseudo-random modification. For instance, values for the four parameters could be selected randomly from a uniform distribution so that x, y, x+width, and y+height are all within 10 cms of the page bounds on all sides.

In step 370, a PDL file with the randomized output may be output. In some embodiments, the output may take the form of output PDL print data 230 and serve as input to PDL processor 240. The iteration may terminate in step 380. When method 300 is used iteratively, various parameters may be randomized for the same input file. In some embodiments, the method may also be repeated for several different pre-existing PDL input files. Output files generated by method 300 from the various input files and the various iterations form a new stochastic regression testing suite. The tests may be used to test PDL processor 240 and would permit stochastic testing of a large variety of test cases. For the rectfill example, a variety of locations for the rectangle, such as (i) where the rectangle was completely within the page bounds (ii) completely outside the page bounds, and (iii) partially but not completely within the page (rectangle clipped to the page), could be tested. In some embodiments, method 300 could be used to randomize the files in a manner consistent with described embodiments, but without altering the basic structure of its input PDL files.

Figure 4:
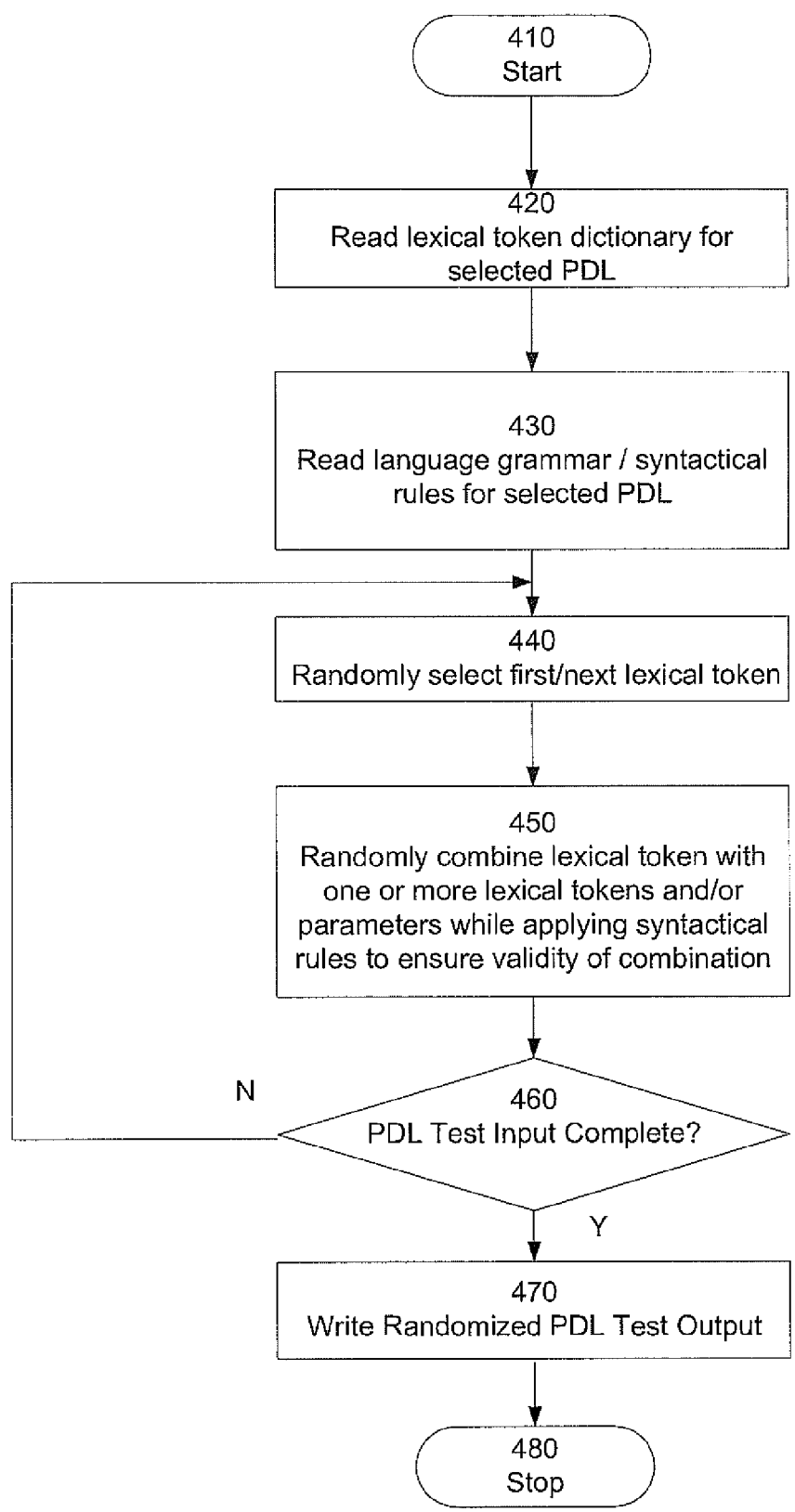
FIG. 4 shows a flowchart depicting another exemplary method for randomizing the test input to a PDL processor for a selected PDL.

FIG. 4 shows a flowchart depicting an exemplary method 400 for randomizing the test input to a PDL processor for a selected PDL. In some embodiments, method 400 may be performed by stochastic test generating application 220. Method 400 may commence in step 410, where initialization routines may be performed. For example, a file to hold the output created by randomizing elements in the input PDL file may be created and any headers for the PDL language may be written to the file.

In step 420, the lexical token dictionary for the selected PDL may be read. The lexical token dictionary may include valid tokens such as commands, delimiters etc. for the selected PDL language. Next, in step 430, the syntactical rules or grammar for the selected PDL may be read. The syntactical rules may describe how tokens may be combined to produce syntactically valid input for the PDL. In some embodiments, the token dictionary and syntactical rules may be read from a database such as database 210 by stochastic test generating application 220. For example, the token "rectfill" may be listed in the token dictionary and classified as a "command" and syntactical rules may specify that the token "rectfill" is optionally preceded by a color value and requires four numeric parameters that precede the ("rectfill") token.

The tokens may be thought of as "alphabet" of elements, and the test file creation process combines letters from the alphabet, with appropriate structuring elements to form valid statements in the PDL. For instance, an alphabet may include a variety of images of various types and sizes at various locations on the page; a variety of strings of text, of various sizes, orientations, fonts, etc; a variety of graphics objects; and any other elements allowed by the language. The test-file creation algorithm can then randomly combine "letters" chosen from this "alphabet" into a single file, while applying rules to maintain syntactical validity.

In step 440, a token may be randomly or pseudo-randomly selected Next, in step 450, the selected token may be combined with one or more other tokens or parameters that may also be randomly selected from a set of valid choices determined using the syntactical rules. For the rectfill example, random values may be assigned to four parameters and the command 0.3 setgray 5 9 1 4 rectfill may be written to the output.

Other examples using the Postscript language could include: a command for a string of magenta text, which could be generated by:

/Arial findfont 16 scalefont setfont 72 72 moveto 1 0 1 setrgbcolor <Text> show where, <Text> can be any random text string inserted by method 400. Similarly, method 400 may randomly generate a command for a simple monochrome image through the PostScript PDL code block shown below:

```
lpicstr 256 string def
72 72 translate
72 72 scale
256 256 8 [256 0 0 −256 0 256]
{currentfile picstr readhexstring pop} image
<image pixel data>
``` where <image pixel data> represents the image pixel data. Note that, in some embodiments, the range of additional tokens available for selection after an initial token has been selected may be governed by the syntactical rules and/or other criteria specified by the user.

In step 460, the algorithm checks if additional lines or code blocks are to be written to the file. For example, if the PDL output has exceeded some specified size or met some other specified criteria ("Y" in step 460), then the algorithm may write out any unwritten randomized test output in step 470 and exit in step 480. On the other hand, if additional lines or blocks are to be written to the file ("N" in step 460), then the algorithm iterates returning to step 440, where another token may be selected randomly.

Figure 5:
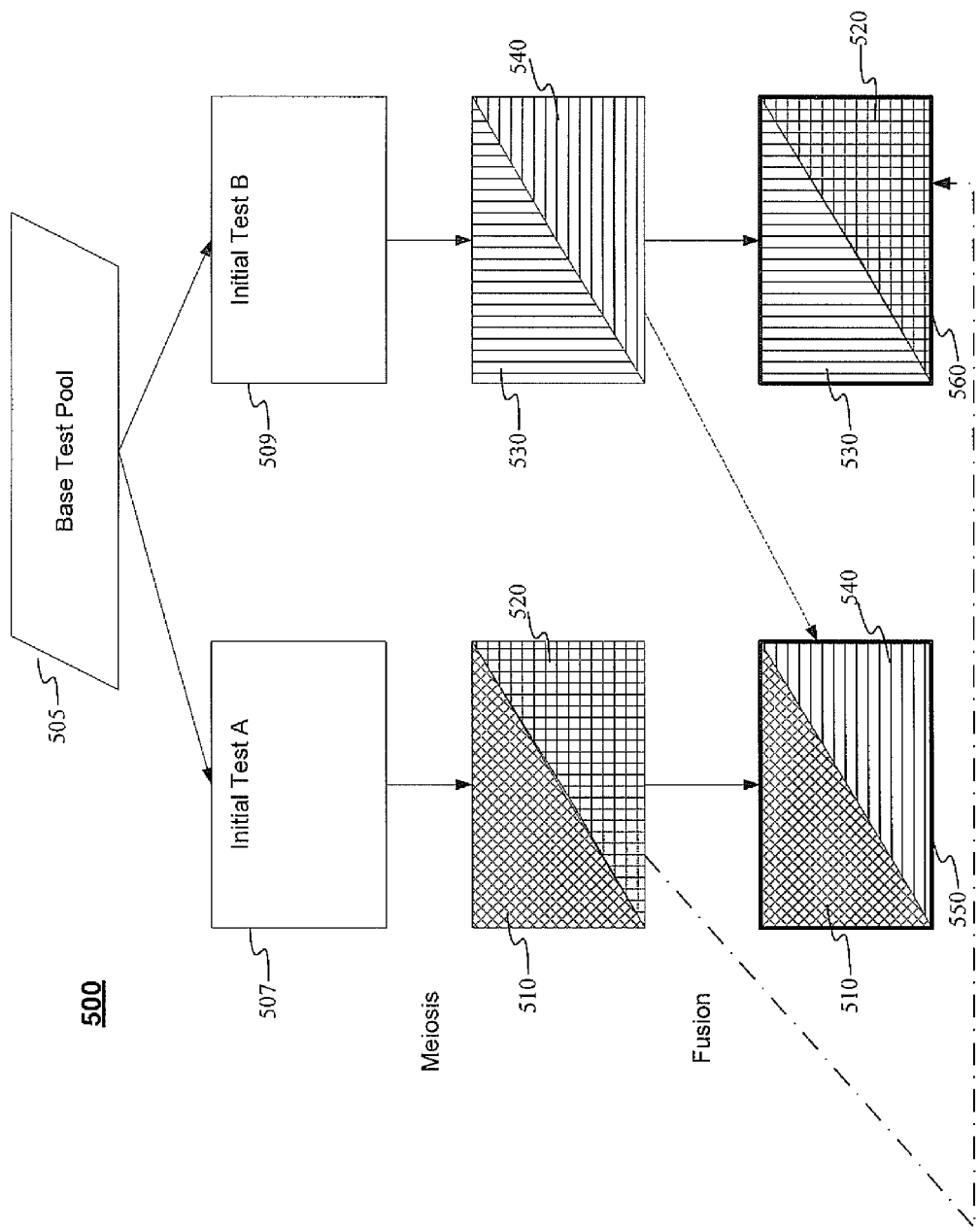
FIG. 5 shows a process flow for an exemplary method for randomizing the test input to a PDL processor for a selected PDL.

FIG. 5 shows a process flow for an exemplary method 500 for randomizing the test input to a PDL processor for a selected PDL. As shown in FIG. 5, base test pool 505 may contain a collection of PDF tests, which may simply be PDL input files to a PDL processor, such as PDL processor 240. In one embodiment, an algorithm implementing process flow 500 may randomly choose two tests Initial Test "A" 507 and Initial Test "B" 509 from base test pool 505. In some embodiments, the algorithm may take the form of a genetic algorithm, in which the tests are decomposed into constituent elements, which may be commands in the selected PDL. The elements may then be recombined to generate new tests.

The choice of tests may also be less than fully random, in order to maximize the variety of constituent elements obtained from decomposing, and to reduce or avoid situations where the tests in test suite generated by recombining the constituent elements results in the testing of a non-optimal or limited variety of cases. The two initial tests may be written in the same PDL and the same PDL version and in general, any two files from the initial population may be decomposed and recombined.

In some embodiments, one or more of the tests in test base 505 may be structured to permit the tests to be broken up into smaller pieces. Because the test files are PDL inputs, the files may be structured to permit the files to be broken up into smaller sections. In some embodiments, delimiters or other tokens in the PDL may be used to determine points at which the input PDL file may be split.

In general, a typical PDL file will typically consist of some header material, perhaps specifying some metadata about the file such as its size or the version number of the page description language in which it is written; an arbitrary number of commands including drawing operations and structuring elements, which are largely or completely independent of one another; and possibly trailer material, which may contain other sorts of metadata or (in the case of PDF, for example) an outline of the structure of the file.

In one embodiment using process flow 500, each of Initial Test "A" 507 and Initial Test "B" 509 may be decomposed into the above constituent parts: the header, a sequence of language commands, and a trailer. In some embodiments, a PDL parser for the selected PDL may be used to implement the decomposition described above. In some embodiments, the set of possible commands produced from the decomposition above may be similar to the set of possible commands that may be used in exemplary method 400.

For example, in the XPS language the content of a single page may be described by a <FixedPage> element. The <FixedPage> element can contain various metadata and an arbitrary number of <Path>, <Glyphs>, or <Canvas> elements. In one embodiment, the decomposition could consider the <Path>, <Glyphs>, or <Canvas> elements as children of the <FixedPage> element, and extract all such children from exemplary Tests "A" 507 and "B" 509 as part of the decomposition process. The <Path>, <Glyphs>, or <Canvas> elements would form part of the set of PDL commands.

XPS also permits a <Canvas> element to contain <Path>, <Glyphs>, or other <Canvas> elements. Therefore, in some embodiments, it would be possible to recursively decompose each <Canvas> element further into its constituent parts, with the result that the set of PDL commands would consist of <Path> elements, <Glyphs> elements, and <Canvas> elements, where the <Canvas> elements would be empty with no drawable content.

Using the initial tests 507 and 509, additional tests may be generated, for example, by splitting each test into two pieces. The process of splitting a test to generate two tests is termed meiosis. This may occur by randomly assigning each command in Test "A" to one of two buckets, and likewise assigning each command in Test "B" to one of two other buckets. In one embodiment, the random assignment may be designed so that each bucket receives half the commands from its parent, resulting in an equal (or nearly equal) number of commands in each of the two buckets produced from a parent test. In another embodiment, the assignment of each command to a bucket may be independent from the assignment of every other command, with a 50% probability that each command will land in each of the two buckets, and with the result that the two buckets could end up containing very different numbers of commands. In a further embodiment, each test may be split once sequentially, so that all commands preceding the split point go into one bucket, and all the commands following the split point go into another bucket.

Regardless of how the splitting occurs, as a consequence of the split of Tests "A" and "B", four pieces 510, 520, 530 and 540 may be generated. The four pieces are shown by different shading patterns in FIG. 5. In one embodiment, the algorithm can produce two new tests 550 and 560 by combining piece 510 with piece 540, and piece 530 with piece 520, respectively. The process of combining the four pieces to generate additional tests is termed fusion.

In the FIG. 5, the formation of two new tests 550 and 560 is shown. The fused pieces may be combined to maintain syntactic validity as defined by the PDL. The fusion process may include randomly assembling the commands in the two pieces, and then adding an appropriate header and appending an appropriate trailer to each of the two pieces. The commands may be assembled in a completely random order, or the relative orders of the commands in each of the constituent pieces may be maintained in the fused test. Some of the associated header and trailer information (such as PDL name and version information) may be copied directly from the original tests "A" and "B", while other information (such as file size or structure data) may be generated based upon the results of the meiosis/fusion process.

In the XPS example above, in the first instance, where the decomposition only went as far as the immediate children of the <FixedPage> element, the core contents of new test 550 could be created by assembling in random order the set of <Path>, <Glyphs>, and <Canvas> elements contained in pieces 510 and 540. In the second instance, where the decomposition recursively decomposed the <Canvas> elements as well, the assembly process may involve random insertion of elements into the empty contents of <Canvas> elements so as to build up a recursive structure in addition to the sequential concatenation of the command elements.

Note that this process may be repeated for the newly created tests 550 and 560. In general, an entire new set of tests may be created by selecting pairs of tests from the original population and applying the meiosis/fusion process to each pair, until all tests in the original population have been used. The entire process may then be iteratively applied on the new population of tests, as many times as desired. The value of the resulting sets of tests depends in part on the richness of the "genetic material" (e.g., set of commands) contained in the original population of tests.

In some embodiments, the new tests may be checked for syntactic validity by using a parser for the PDL language. Note that additional possibilities for randomization exist. For example, method 300 could be applied to the output produced by either method 400 or process flow 500.

In some cases, randomization techniques outlined above may facilitate certain types of behavioral verification. For instance, for some data files the result of PDL processing will be a single page of output regardless of the values of the parameters within the data file. In this case, an analyzing routine may be able to verify that exactly one page is produced, regardless of the parameter values set by the randomizing algorithm. As another example, the total number of non-white pixels on a rasterized page may be within known bounds without regard to parameter values in a PDL input file.

Again, an analyzing routine may be able to verify that these bounds are respected by the PDL processor.

Other embodiments will be apparent to those skilled in the art from consideration of the specification and practice of one or more embodiments disclosed herein. It is intended that the specification and examples be considered as exemplary only, with true scope and spirit being indicated by the following claims.

What is claimed is:

1. A computer-implemented method for generating stochastic page description language test inputs, wherein the method comprises:
modifying at least one page description language file from a plurality of existing page description language files by:
replacing existing text data in the page description language file with randomly generated text data;
performing the steps of:
replacing values of parameters associated with at least one existing graphics object in the page description language file with randomly generated parameter values,
replacing values of parameters associated with at least one image object in the page description language file with randomly generated parameter values, and
replacing values of parameters associated with graphical combining operations for at least one image or graphics object with randomly generated parameter values; and
modifying values of page description language command parameters in the page description language file with randomly generated parameter values; and
storing the at least one modified page description language file.

2. The computer-implemented method of claim 1, wherein the randomly generated text data is generated by using an ipsum-lorem generator.

3. The computer-implemented method of claim 1, wherein the parameters associated with the graphics object include at least one of a path parameter, a fill color parameter, or a fill pattern parameter.

4. The computer-implemented method of claim 1, wherein the parameters associated with the image object include at least one of an output size parameter, a geometrical transformation parameter, or a color space parameter.

5. The computer-implemented method of claim 1, wherein the parameters associated with graphical combining operations include at least one of a transparency parameter, or a raster operation parameter.

6. The computer-implemented method of claim 1, wherein the method is performed by at least one processor of:
a computer, or
a printer, or
at least one computer coupled to at least one printer.

7. A non-transitory computer readable medium that contains instructions, which when executed by a processor perform steps in a method for generating stochastic page description language test inputs, wherein the method comprises:
modifying at least one page description language file from a plurality of existing page description language files by:
replacing existing text data in the page description language file with randomly generated text data;
performing the steps of:
replacing values of parameters associated with at least one existing graphics object in the page description language file with randomly generated parameter values, replacing values of parameters associated with at least one image object in the page description language file with randomly generated parameter values, and replacing values of parameters associated with graphical combining operations for at least one image or graphics object with randomly generated parameter values; and modifying values of page description language command parameters in the page description language file with randomly generated parameter values; and storing the at least one modified page description language file.

8. The non-transitory computer readable medium of claim 7, wherein the parameters associated with the graphics object include at least one of a path parameter, a fill color parameter, or a fill pattern parameter.

* * * * *